(12) United States Patent
Davies

(10) Patent No.: US 6,901,053 B1
(45) Date of Patent: May 31, 2005

(54) CONNECTIONLESS NETWORK EXPRESS ROUTE

(75) Inventor: Elwyn B Davies, Ely (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,542

(22) Filed: Dec. 29, 1999

(51) Int. Cl.$^7$ ............................. H04J 1/16; H04J 3/14
(52) U.S. Cl. ..................................... 370/237; 370/400
(58) Field of Search ............................... 370/351, 389, 370/392, 396, 400, 401, 468, 237, 238, 225, 228, 238.1, 229, 217, 218

(56) References Cited

U.S. PATENT DOCUMENTS

| | | | |
|---|---|---|---|
| 5,912,877 A | * 6/1999 | Shirai et al. | 370/228 |
| 5,940,372 A | * 8/1999 | Bertin et al. | 370/238 |
| 6,064,653 A | * 5/2000 | Farris | 370/237 |
| 6,154,445 A | * 11/2000 | Farris et al. | 370/237 |
| 6,201,810 B1 | * 3/2001 | Masuda et al. | 370/395.32 |
| 6,215,765 B1 | * 4/2001 | McAllister et al. | 370/217 |
| 6,236,642 B1 | * 5/2001 | Shaffer et al. | 370/237 |
| 6,336,129 B1 | * 1/2002 | Ise et al. | 709/201 |
| 6,370,112 B1 | * 4/2002 | Voelker | 370/218 |
| 6,438,110 B1 | * 8/2002 | Rai et al. | 370/254 |
| 6,453,349 B1 | * 9/2002 | Kano et al. | 709/226 |
| 6,483,833 B1 | * 11/2002 | Jagannath et al. | 370/392 |
| 6,490,252 B1 | * 12/2002 | Riggan et al. | 370/237 |
| 6,538,991 B1 | * 3/2003 | Kodialam et al. | 370/229 |
| 6,574,216 B1 | * 6/2003 | Farris et al. | 370/352 |

* cited by examiner

Primary Examiner—Ajit Patel
(74) Attorney, Agent, or Firm—Barnes & Thornburg

(57) ABSTRACT

A priority routing service is provided for a predetermined network user in a connectionless network such as an IP network. The network comprises a plurality of network elements and links therebetween and the express route comprises one or more links between two elements. Elements at each end of the express route are arranged to identify packets originating from the user and destined for a customer, or to identify data packets originating from a customer and destined for the user, and to divert data packets along the express route. This allows traffic to/from the users to avoid bottlenecks in the network.

12 Claims, 3 Drawing Sheets

CONNECTIONLESS NETWORK EXPRESS ROUTE

FIELD OF THE INVENTION

The present invention relates to connectionless networks such as IP networks for example, and in particular to the provision of express or priority routes for priority traffic.

BACKGROUND OF THE INVENTION

Communications systems increasingly use connectionless networks such as internet protocol (IP) networks for example. Connectionless networks comprise a number of network elements such as routers for example, which are connected together according to some topology. Traffic introduced into the network at a network element and destined for another element including an access element at the network periphery for example is directed across the network according to forwarding tables in each of the network elements it passes through. The forwarding tables in each element map the traffics end destination in the network onto a network element directly connected to the current element. In this way traffic across the network makes a series of short hops from network element to network element according to each elements forwarding tables. The forwarding tables are created automatically by distributed software programmes and protocols called routing protocols (eg OSPF or BGP4) as a result of routing guidelines provided by network operators and designers.

Because of the size and complexity of many networks, together with the practical difficulties of predicting traffic flows through the network, congestion points or bottlenecks can result in practical networks. While forwarding tables of network elements can be amended to try to mitigate congestion in other elements, this can have a knock on effect on the rest of the network creating other congestion points for example.

SUMMARY OF THE INVENTION

It is an object of the present invention to provide an improved method of operating a network to mitigate the effects of congestion points within the network for high priority traffic.

It is a further object of the present invention to provide a method and apparatus for providing improved traffic routing within the networks.

In a first aspect the present invention comprises a method of operating a connectionless network to provide a priority routing service for a network user having a plurality of customers communicating with said user via said network, the network comprising a plurality of network elements and links therebetween, the method comprising:

maintaining an express route comprising one or more said links between two end elements;

at least one said end element arranged to identify data packets originating from said user and destined for a said customer or originating from a said customer and destined for said user and diverting said packets along said express route.

Preferably said route is bi-directional, both said end elements being arranged to identify and divert said packets.

Preferably said maintaining step comprises reserving bandwidth on said links forming said route.

Preferably said route has one end element adjacent or forming the network entry point of said user.

Preferably said diverting step comprises modifying a forwarding table within one said end element such that data packets having a destination address corresponding to said user are diverted along said route.

Preferably said diverting step comprises filtering data packets within the other said end element such that data packets having a source address corresponding to said user are diverted along said route.

In a second aspect the present invention provides a network element for use in a connectionless network comprising a plurality of network elements and links therebetween, the network element comprising:

means for routing data packets onto another element dependent on a destination address of said packets;

filter means for identifying and diverting data packets having a source address corresponding to a predetermined user, said identified packets being diverted to an element not specified by said routing means and forming part of an express route for said user.

In a third aspect the present invention comprises a plurality of network elements and links therebetween;

means for maintaining an express route comprising one or more said links between two end elements;

wherein at least one said end element is arranged to identify data packets originating from a network user and destined for one of a plurality of customers of said user or originating from a said customer and destined for said user and diverting packets long said express route.

BRIEF DESCRIPTION OF THE DRAWINGS

In order that a greater understanding of the invention can be obtained, embodiments of the invention will now be described with reference to accompanying drawings, by way of example only and without intending to be limiting, in which.

DETAILED DESCRIPTION

Figure 1:
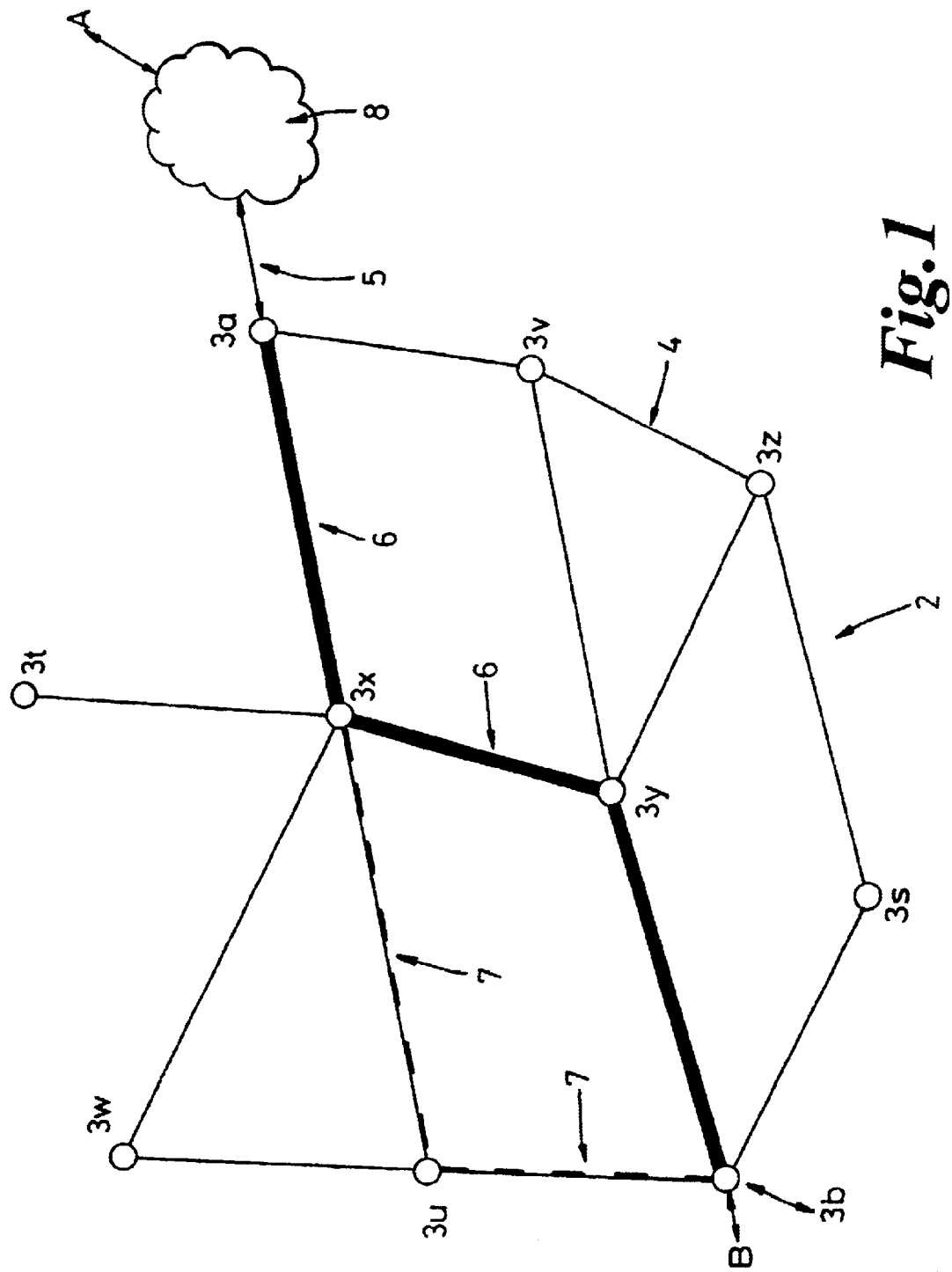
FIG. 1 shows a schematic diagram of a network topology.

Referring to FIG. 1, a connectionless network for example an IP network is shown and comprises a number of network elements 3 such as routers or switches for example, which are connected to other network elements 3 by links or pathways 4 according to an overall network topology. The manner in which the elements are connected to each other will depend on for example their geographical location as well as available physical transmission lines or links between these locations.

At the periphery of the network 2, access points or gateways 5 connect the network 2 to customers or other networks such as access networks 8. Customers B are also connected to the network 2 by network elements 3. User traffic between one access point land another on the network 2 is routed via the network elements 3 in a series of hops. Each network element contains a forwarding table which directs incoming traffic out to another network element directly connected to the current network element, the ongoing network element 3 being selected by the forwarding table dependant on the traffics final destination, as is well known in the art. The forwarding tables tend to be reasonably static with a connectionless network in the absence of faults and are set up according to the network topology (and possibly expected traffic flows) so that for example traffic from A to B will initially enter the network 2 at network element 3a. The forwarding table of network element 3a determines the traffics final address as B and routes the traffic onto network element 3x. Similarly the forwarding table of element 3x maps traffic destined for B onto network element 3y, and from there on to element 3b where it then leaves the network to complete its journey to B. A typical route from A to B through network 2 is then shown as 6. Because of other traffic flows through the network 2, such as that between elements 3w and 3z for example, congestion points or bottlenecks may rise within the network for example at element 3y.

The invention provides a method of implementing alternative routing for priority customers whereby traffic for these customers is re-routed to avoid network bottlenecks (such as 3y). These priority customers may be high revenue generating customers for the network operator for example, or they may pay a premium for this alternative or express routing service.

The invention also provides a method of implementing alternative routing as part of the set up for a "calling event". Due to a current affairs phenomenon for example, there may be an expectation of heavy traffic in the certain part of the network and this traffic flow can be ameliorated by implementing various alternative routes to more evenly distribute traffic flow through the network.

In the present example, considering B as a priority customer or focus of the "calling event" such as an E commerce site or website for example, traffic routed to and from B across the network 2 is diverted around bottlenecks or high congestion network elements 3 within the network 2. For example traffic between A and B upon reaching element 3x is diverted to element 3u instead of element 3y where the rest of the traffic from element 3x destined for B is sent. Similarly this "priority" traffic for B arriving at element 3u is directed from there to element 3b forming an express route 7 between elements 3x and 3b. This express route 7 avoids the congested element 3y, and thereby provides a faster route for traffic between A and B. In a similar fashion, traffic from B to A entering the network at element 3b is directed to element 3u and then on to element 3x where it joins the rest of the traffic from B destined for A.

The express route 7 comprises reserved or dedicated bandwidths on specific paths or connections between network elements to bypass known congestion points on the network. The express routes may be uni or bidirectional depending on the service required. For example where the express routing service is provided for a web page where the traffic is highly asymmetrical, it is likely that a unidirectional path will be sufficient. The amount of bandwidth reserved for each path and direction will depend on what the express routing service is provided for and what the customer is prepared to pay for. The example express route 7 shown may be used for other high priority traffic for example that between network element 3t and B.

There are a number of mechanisms for reserving bandwidth for express routes. For example it may be known that while the capacity of a particular link 4 is 50 Mb/s the typical loading on this link is only 10 Mb/s. In these circumstances it would be possible for example to reserve four priority routes of 10 Mb/s for four priority customers. Other method of reserving bandwidth on links within a network are known such as "TCP trunking" for example.

The express route 7 is implemented by network elements 3b 3u and 3x as follows. For priority traffic flowing front A to B, the forwarding table of element 3x is modified to include a specific IP address for customer B which maps traffic corresponding to this address to network element 3u instead of element 3y. Because network elements implement a "find longest match first" algorithm, traffic having a destination address corresponding to B will be routed directly to element 3u whereas other traffic which is being routed to element 3b but not to B will be routed from 3x to element 3y.

Because routers typically just look at the destination address of a data packet, implementation of the express route 7 in the forward direction towards the customers site B is relatively straight forward. The reverse direction however is not so straight forward where packets from B are destined for A for example.

Figure 2:
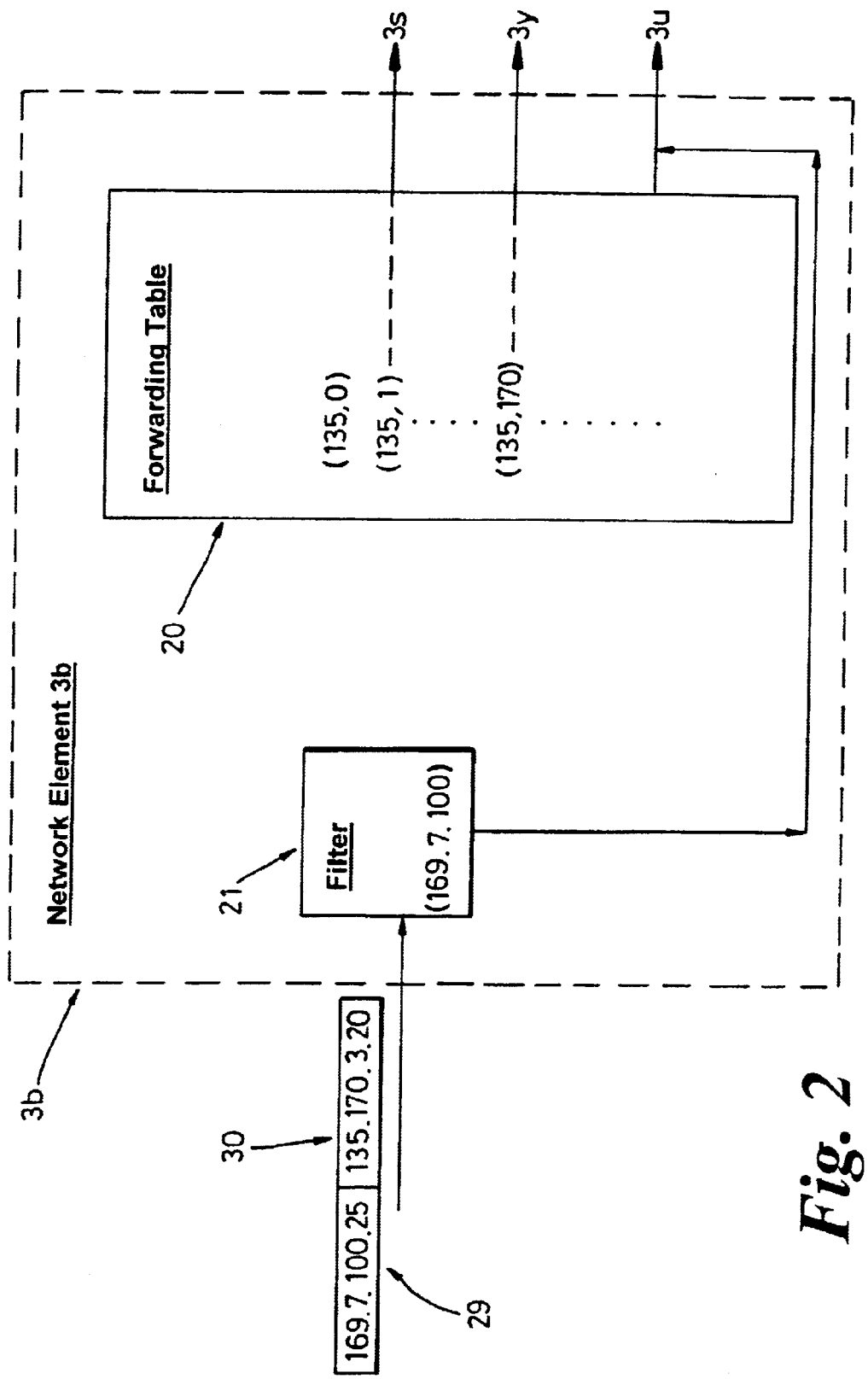
FIG. 2 shows a schematic diagram of a network element according to the invention.

FIG. 2 shows a schematic diagram of network element 3b according to the invention which comprises a forwarding table 20 and a filter 21. Incoming data packets from customer B are routed onto network elements connected to element 3b such as 3s, 3u, and 3y, according to its forwarding table 20. Each traffic packet comprises a destination address 30 which is mapped by the forwarding table 20 to an output connection on the network element corresponding to one of the network elements directly connected to it as is known in the art. For example where the packet address, shown in IP format, corresponds to a destination A, this would normally be routed to network element 3y by the forwarding table 20.

To implement the express route 7 the, network element 3b includes a filter 21 which identifies source addresses 29 associated with a high priority customer B and re-routes them by the express routes 7 to element 3u. The filter function 21 may be implemented in hardware or software depending on the speed required. The filter 21 re-routes packets with a source address 29 corresponding to the priority customer B within the network element 3b to a special queue for express lane traffic. As is known with network elements such as routers and switches, the various queues within these elements are allocated percentage opportunities for output from the element 3b and this output;opportunity percentage can be tuned according to the needs of the network and the priority express route 7.

In an alternative embodiment, the filter 21 may be placed between the forwarding table and the output to element 3y, where traffic destined for B is then specifically rerouted to element 3u.

As a further alternative, the express route 7 may be implemented using MPLS (Multi Protocol Label Switching) pathways set up for traffic to and from customer B. In the example shown in FIG. 1, MPLS labels will be used for the path 7 between elements 3x and 3b. The express route 7 differs from normal MPLS routing in that the MPLS pathway is set up for particular priority customers and not between specified nodes or elements within the network. At the start of each MPLS path, methods similar to those described previously are used to select the correct path which is to be used and assign the label to the packet which guides it along the path.

The express route technique allows a carrier to offer an enhanced service to particular customers which expect to receive and/or transmit data traffic from any arbitrary source/destination, for example a web server or e-commerce site. Without the express route, traffic to and from the customers site will pass through any or all of the bottlenecks or congestion points of the carriers network and may be subject to unexpected delay or loss. In particular, as the traffic converges or diverges from the customers site, the concentration of the traffic may interact with other traffic to generate a specific bottleneck which is not under the control of the customer. With express routes 7 implemented in the network the traffic can be picked up and routed on dedicated paths with reserved resources to points in the carriers network where it is dispersed sufficiently to avoid the sort of congestion described above. The amount of bandwidth reserved can be negotiated by the customer as appropriate for the traffic expected, and the performance of the customers applications become more controllable.

Preferably therefore, one end of the express route is implemented near the customers network access point.

The Express Route technique differs from a Virtual Private Network or Extranet implementation in that the Express Route is concerned with providing a service for a predetermined user having a plurality of customers on the network. The Express Route provides a reserved bandwidth for priority traffic (data packets) destined for the user from his customers and/or originating from the user and destined for his customers. This allows the user to provide a faster service for his customers and is a service which the network operator may charge for.

The Data Express Route solves a difficult problem than either a VPN (Virtual Private Network) or an Extranet. In both of these cases the source and destination for all possible traffic through the network are known in advance and implemented as "points of presence" where the VPN or Extranet traffic is injected into or extracted from the network.

The Express Route provides a solution for predetermined users who wish to send and receive traffic from any other customer attached to the network, and hence can only know in general terms where the traffic will occur in the network. The Data Express Route. provides collectors or concentrators (for example filters or forwarding table modifications) at strategic points in the network which are not specific to any particular customer to divert the selected priority traffic into the Express Route.

Figure 3:
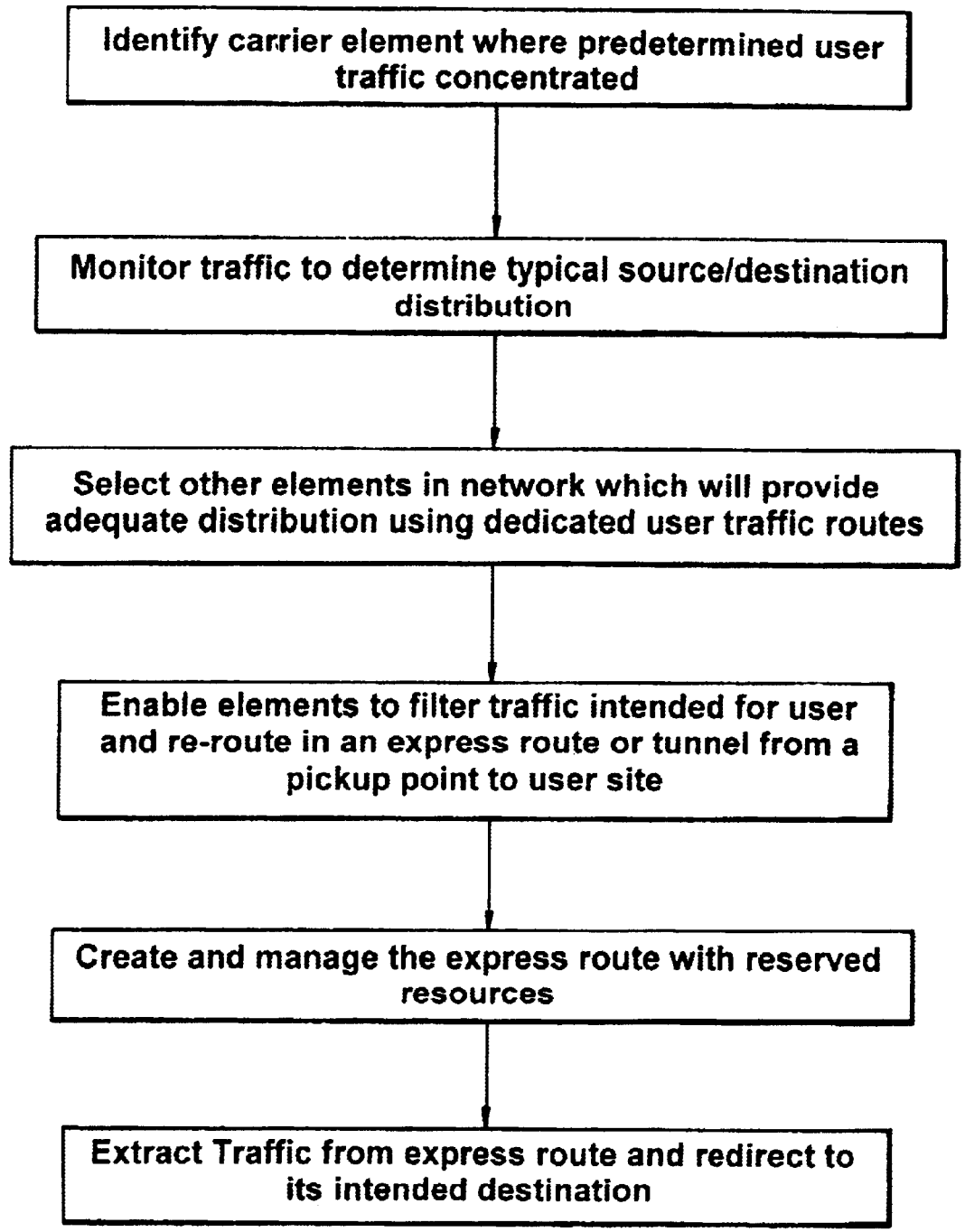
FIG. 3 shows a flow diagram of a method according to the invention.

FIG. 3 shows a method of determining and using express routes 7 within a connectionless network 2. It is first necessary to identify carrier nodes or elements where customer traffic is concentrated. This is typically done using network manager and analysis packages such as the trail manager package described in applicant's co-pending application Ser. No. 09/219,374. Using these sorts of packages, it is possible to determine typical traffic levels on various links within the network and from this to determine alternative links for priority customer express routes 7. Network elements at either end of the selected express route 7 are modified as described above, either by modifying the forwarding table of the network element at the distal end of the route 7 or by incorporating a filter 21 within the network element adjacent the priority customers site. Intermediate elements (eg 3u in FIG. 1) may also require modification either by modifying the forwarding table or introducing a filter 21 depending on how they would normally route traffic including the express route packets incident on them. For example, if traffic into element 3u destined for B would normally be routed to 3b by the element in an unmodified state, then there is no need to modify it. With an MPLS path, the standard MPLS required modifications will be implemented on element 3u as is known in the art.

At the customers site element or access point the traffic is extracted from the express route 7 and directed to the customer. The traffic outgoing from the customer is filtered onto the relevant express route 7 to the appropriate network element for the traffics intended destination. At this point the traffic is extracted from the express route 7 and redirected to the intended destination in the normal way.

The foregoing describes the present invention including preferred embodiments thereof. Alterations and modifications as would be obvious to those skilled in the art are intended to be incorporated within the scope hereof.

What is claimed is:

1. A method of operating a connectionless network to provide a priority routing service for traffic between a predetermined network user and a plurality of customers communicating with said user via said network, the network comprising a plurality of network elements and links therebetween, the method comprising:

monitoring said connectionless network to determine an actual, or expected, congestion point;

maintaining an express route for carrying said traffic, the express route comprising one or more said links between two end elements which bypasses said congestion point;

identifying, at one or both said end elements, data packets originating from said user and destined for one of said customers or data packets originating from one of said customers and destined for said user, and diverting said packets along said express route.

2. A method as claimed in claim 1 wherein said route is bidirectional, both said end elements being arranged to identify and divert said packets.

3. A method as claimed in claim 1 wherein said maintaining step comprises reserving bandwidth on said links forming said route.

4. A method as claimed in claim 1 wherein said route has one end element adjacent or forming the network entry point of said user.

5. A method as claimed in claim 1 wherein said diverting step comprises modifying a forwarding table within one said end element such that data packets having a destination address corresponding to said user are diverted along said route.

6. A method as claimed in claim 1 wherein said diverting step comprises filtering data packets within the other said end element such that data packets having a source address corresponding to said user are diverted along said route.

7. A network element for use in a connectionless network comprising a plurality of network elements and links therebetween and an express route for carrying traffic between a predetermined network user and a plurality of customers, the express route comprising one or more links between two end elements which bypasses a congestion point, the network element comprising:

means for routing data packets onto another element dependent on a destination address of said packets and filter means for identifying and diverting data packets having a source address corresponding to said user, said identified packets being diverted to an element not specified by said routing means and forming part of said express route for said user.

8. A connectionless network comprising:

a plurality of network elements and links therebetween;

means for monitoring said connectionless network to determine an actual, or expected, congestion point;

means for maintaining an express route comprising one or more said links between two end elements which bypasses said congestion point;

wherein at least one said end element is arranged to identify data packets originating from a network user and destined for one of a plurality of customers of said user, or data packets originating from a one of said plurality of customers and destined for said user, and to divert said packets along said express route.

9. A method of operating a connectionless network to provide a priority routing service for traffic between a predetermined network user and a plurality of customers communicating with said user via said network, the network comprising a plurality of network elements and links therebetween, the method comprising:

monitoring said connectionless network to determine an actual, or expected, congestion point;

maintaining an express route for carrying said traffic, the express route comprising one or more said links between two end elements which bypasses said congestion point;

identifying, at one or both said end elements, data packets originating from said user and destined for one of said customers or data packets originating from one of said customers and destined for said user, and diverting said packets along said express route; and identifying elements of the network where traffic between said user and one or more of said customers is concentrated and selecting one of the identified elements where traffic is concentrated as one of said end elements of the express route.

10. A connectionless network comprising:

a plurality of network elements and links therebetween;

means for monitoring said connectionless network to determine an actual, or expected, congestion point;

means for maintaining an express route comprising one or more said links between two end elements which bypasses said congestion point;

wherein at least one said end element is arranged to identify data packets originating from a network user and destined for one of a plurality of customers of said user, or data packets originating from one of said plurality of customers and destined for said user, and to divert said packets along said express route; and means for identifying elements of the network where traffic between said user and one or more of said customers is concentrated and for selecting one of the identified elements when traffic is concentrated as one of said end elements of the express route.

11. A method according to claim 1 wherein said data packets are identified in dependence on both their source and destination addresses.

12. A connectionless network according to claim 8 wherein said data packets are identified in dependence on both their source and destination addresses.

* * * * *